United States Patent [19]

Wiedenmann

[11] Patent Number: 5,193,624
[45] Date of Patent: Mar. 16, 1993

[54] DEVICE FOR LOOSENING SUB SOIL

[75] Inventor: Georg Wiedenmann, Rammingen, Fed. Rep. of Germany

[73] Assignee: Wiedenmann GmbH, Rammingen, Fed. Rep. of Germany

[21] Appl. No.: 721,504

[22] PCT Filed: Nov. 8, 1990

[86] PCT No.: PCT/DE90/00844
 § 371 Date: Aug. 7, 1991
 § 102(e) Date: Aug. 7, 1991

[87] PCT Pub. No.: WO91/07076
 PCT Pub. Date: May 30, 1991

[30] Foreign Application Priority Data
 Nov. 8, 1989 [DE] Fed. Rep. of Germany ....... 3937211

[51] Int. Cl.$^5$ ............................................. A01B 45/02
[52] U.S. Cl. ....................................... 172/84; 172/91; 172/96
[58] Field of Search ........................ 172/84, 91, 92, 93, 172/94, 95, 96, 97, 710

[56] References Cited

U.S. PATENT DOCUMENTS

| 962,520 | 6/1910 | Nielsen | 172/84 |
| 994,321 | 6/1911 | Klaus | 172/84 |
| 1,569,070 | 1/1926 | Cain | 172/96 X |

FOREIGN PATENT DOCUMENTS

| 89538 | 7/1980 | Japan | 172/84 |
| 13795 | of 1909 | United Kingdom | 172/84 |

Primary Examiner—Dennis L. Taylor
Assistant Examiner—Jeffrey L. Thompson
Attorney, Agent, or Firm—Max Fogiel

[57] ABSTRACT

The invention concerns a device (1), which is self-powered or can be connected-up to a vehicle, for loosening the sub-soil, the device having an array of piercing tools (13) mounted substantially perpendicular to the direction of travel of the device. Before driving into the soil, the tools are oriented by means of a jointed-rod parallelogram, independently of the penetration depth selected (the penetration depth is adjustable). The position of the link rod (21) running approximately parallel to the chassis-mounted linkage between the two chassis-mounted bearings (7,8) can be altered by pivoting the piercing tool (13) or its mounting (14), against the bias of a spring (22), in a direction away from a stop (23) while the tool is executing the loosening movement in the soil.

12 Claims, 2 Drawing Sheets

DEVICE FOR LOOSENING SUB SOIL

BACKGROUND OF THE INVENTION

This invention is concerned with a device for loosening sub-soil. There are known a number of devices which by means of tools pierce openings into the soil either for the purpose of making grooves for putting in seeds or for the ventilation and/or drainage of the soil etc. Especially for the latter-mentioned purpose the opening produced on the surface of the soil by piercing in the tool and remaining after its removal is to stay small whereas in the deeper area of the soil a more extensive movement of the tool is to be produced transversely to the piercing or digging direction.

It is basically known to pivotably support such piercing tools on a controllable tool carrier on a vertical plane extending in the travelling direction and to move them under the action of spring force against a stop which ensures that the piercing tool prior to being pierced into the soil has a certain orientation thereto which at least approximately agrees particularly with the pressure load direction at the time of penetrating into the soil. The piercing of the tools into the soil takes place with the device being moved in the travelling direction by which travelling movement the tool, which has penetrated the soil, is pivoted in a certain manner, however, not to such an extent that any tearing-up movement takes place on the surface of soil on removing the tool. The small displacement in the soil out of the orientation position predetermined by the stop the tool carries out against the force of the above-mentioned spring. After the tool has left the soil it is again moved under the force of the said spring against the stop and thereby pivoted towards the orientation direction provided for the repeated penetration of the soil. The operation of such tools or arrays of tools takes place in a manner known per se with the aid of a crank mechanism which is operated in the course of the travelling movement corresponding to the desired density of penetration.

SUMMARY OF THE INVENTION

The invention is based on the object of guiding the tools of such a device in a steered manner such that their orientation prior to the penetration of the soil is as far as possible independent from the differently adjustable penetration depth respectively provided. Such a determination of the penetration depth can be realized in a very simple manner by a height-displaced adjustability between a roller feeler and/or castor wheel and the chassis of the device.

For the solution of this object according to the invention the tool is supported on steering rods which upon the orientation of the tool to its piercing-in position, i.e. under a spring-loaded abutment against the stop, at least approximately form a jointed-rod parallelogram. There are comprised by this jointed-rod parallelogram the chassis part between two chassis-mounted bearings, parallel and opposite thereto a connecting lever between a coupling point of the tool and a guide lever as well as an working lever between one of the chassis-mounted bearings and the pivot bearing of the piercing tool, respectively its holder, and parallel and opposite thereto the said guide lever. This parallelogram ensures that the orientation of the tool is maintained independently from the adjusted penetration depth so that any adjustment or setting of the stop responsive to the penetration depth is not necessary. Accordingly, the adjustability of the stop is necessary only for the determination of the desired tool orientation per se.

BRIEF DESCRIPTION OF THE DRAWINGS

Preferred embodiments of the invention are now described by way of the drawings wherein it is shown in.

Figure 1:
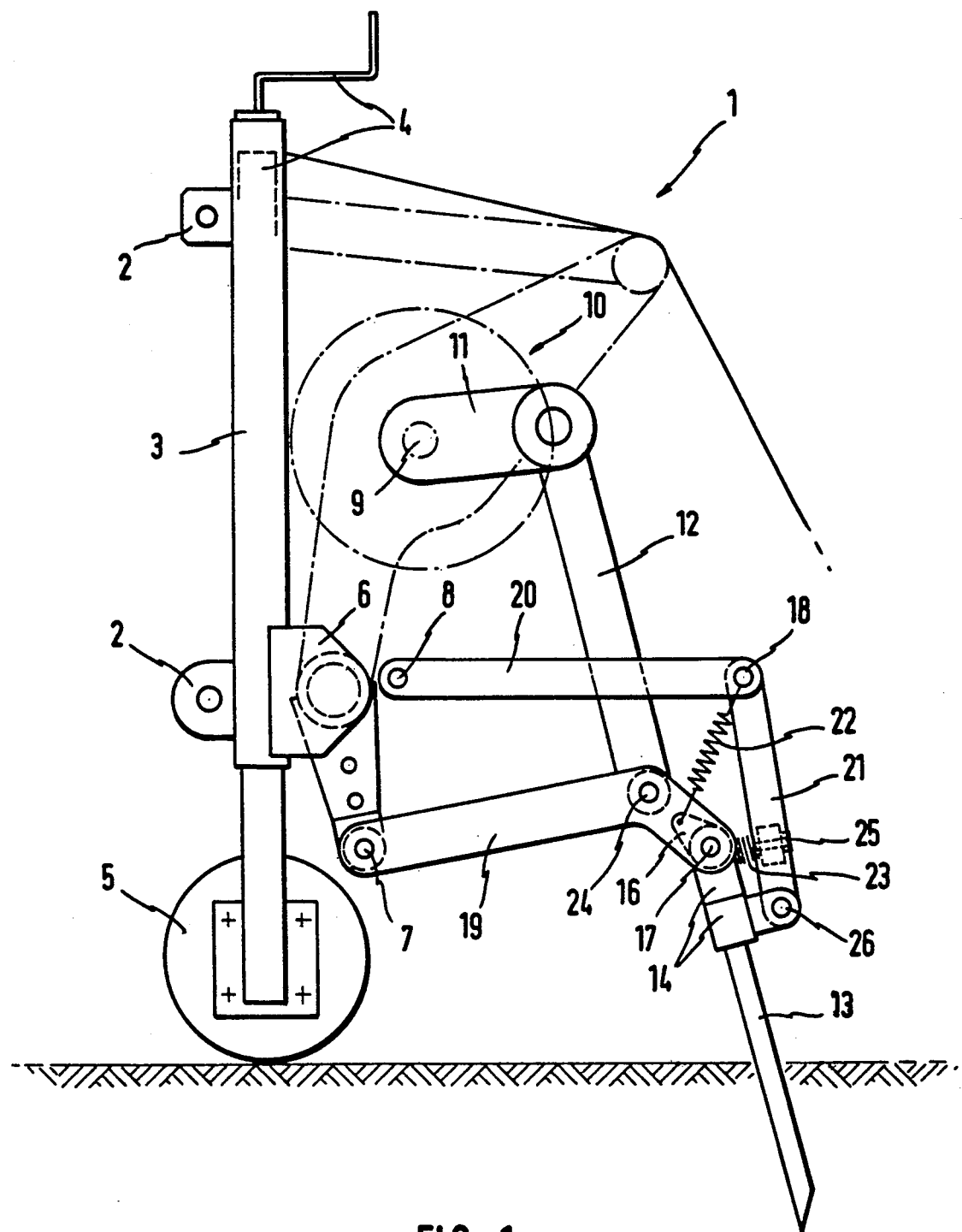
FIG. 1

A side view of the device in a first preferred embodiment.

FIG. 2

An enlarged view of a detail of the device in a modified form.

DESCRIPTION OF THE PREFERRED EMBODIMENTS

The device, as a whole designated by reference numeral 1, shows at position 2 connections which symbolically represent the mountability of the device on a tractor or similar self-powered vehicle. On the chassis 3 (which is only schematically shown) of the device there is by means of a hand-operated spindle system 4 supported a castor wheel 5 so as to be adjustable in its height. Formed on the chassis 3 are a number of brackets 6 corresponding to the number of tools, pairs of tools or arrays of tools to be simultaneously operated in the same working phase, the said brackets having chassis-mounted bearings 7 and 8.

Crank mechanisms 10, which are also allocated to these individual tools, pairs of tools or arrays of tools, are supported about a common shaft 9. The crank arms 11 of the crank mechanisms allocated to the tools, pairs of tools or arrays of tools are angularly displaced to one another so that the tools, pairs of tools or arrays of tools successively carry out the working of the soil which is cyclically repeated in the course of the travelling of the device, respectively the crank movements. The crank rods 12 provided on the end of the crank arms 11 away from the shaft 9 are coupled to the rods which allocated to the individual tools, pairs of tools or arrays of tools and connected to the brackets, namely in a manner which is described in more detail hereunder.

The schematical side view of the preferred embodiment only shows one out of a plurality of piercing tools and their jointed rods and crank mechanisms. The piercing tool 13 is securely anchored in a mounting 14. The mounting has a lateral extension arm 16 extending so as to radially project from a swivelling axis 17 of the mounting 14. Between the radially outer end of the extension arm 16 and an articulation point 18 between two levers 20 and 21 there is interposed a pre-loaded tension spring 22 which tends to pivot the tool with its tip end towards the travelling direction.

Articulated to the chassis-mounted bearing 7 of the bracket 6 is one end of the working lever 19 which other end receives the pivot bearing of the tool mounting 14, namely at an coupling point 17 under formation of the swivelling axis for the tool. To the other chassis-mounted bearing 8, which is located above bearing 7 relative to the soil to be worked, there is articulated one end of a guide lever 20 which other end, which is rearwardly facing in the travelling direction, receives articulation point 18 to which the upper end of a connection lever 21 is coupled which lower end is articulated at position 26 to a fixed projection of the tool mounting 14. In the vicinity of coupling point 17, i.e. viewed from the aforementioned articulation point towards the articulation to the first chassis-mounted bearing 7 locating forward in the travelling direction in an angled portion of the working lever 19, there is formed an introduction joint to which the end of the crank rod 12 of the associated crank mechanism 10 averted from the crank arm 11 is coupled and is introducing the piercing force.

The arrangement of the levers is made such that the distance between the fixed bearing 7 and coupling point 17 corresponds to the distance between the bearing 8 and articulation point 18 and that the distance between the chassis-mounted bearings 7 and 8 corresponds to that between coupling point 17 and articulation point 18. By means of imaginary connecting rods overlapping these distances in a straight line the latter can be combined to a jointed-rod parallelogram. For that reason the tool supported within this parallelogram and pivoted in a manner such as to rest against the stop is maintained in the same orientation independently from the penetration depth prior to piercing into the soil and after leaving the soil. Within the soil a pivoting of the tool takes place by virtue of the movement in the travelling direction, the tool leaving a stop 23, which is arranged on the connecting lever 21 and which contacting surface engages the tool mounting 14 in the vicinity of the coupling point 17, under tensioning of the spring 22 and pivoting about coupling point 17. With the aid of adjusting means 25 the stop 23 is adjustable with view to the distance of its contacting surface from the lever 21 whereby the orientation of the tool, respectively the orientation angle between the tool and the soil is adjustable.

When under the load of the travelling movement the tool pierced into the soil carries out a pivotal or swivelling movement about the swivelling axis on coupling point 17, the shaft of the tool in the area of the soil surface is held by the higher density or consistency there existing and accomplishes a swivelling motion distance mainly in its tip portion whereby the soil underneath the surface is moved more strongly and thus loosened. In the course of this swivelling motion away from the stop and under tensioning of the spring 22 the jointed-rod parallelogram is, of course, opened but reassumes its shape on leaving the soil by the back-swivelling motion of the tool under the force of the spring.

In order to damp the swivelling motion of the tool taking place under the force of the spring and the impulse generated when the tool hits the stop a separate damper may provided, for example, a customary shock absorber. However, such a shock absorber may also be integrated in or formed by the stop itself.

By the arrangement of the guide lever on top of the working lever the space around the tool is kept free so that its piercing motion is not obstructed either by uneven soil or soil covered with stones etc. This also applies for the arrangement of the spring which otherwise may be arranged randomly and also be provided as a pressure spring if the tool is loaded by it only against the stop.

Figure 2:
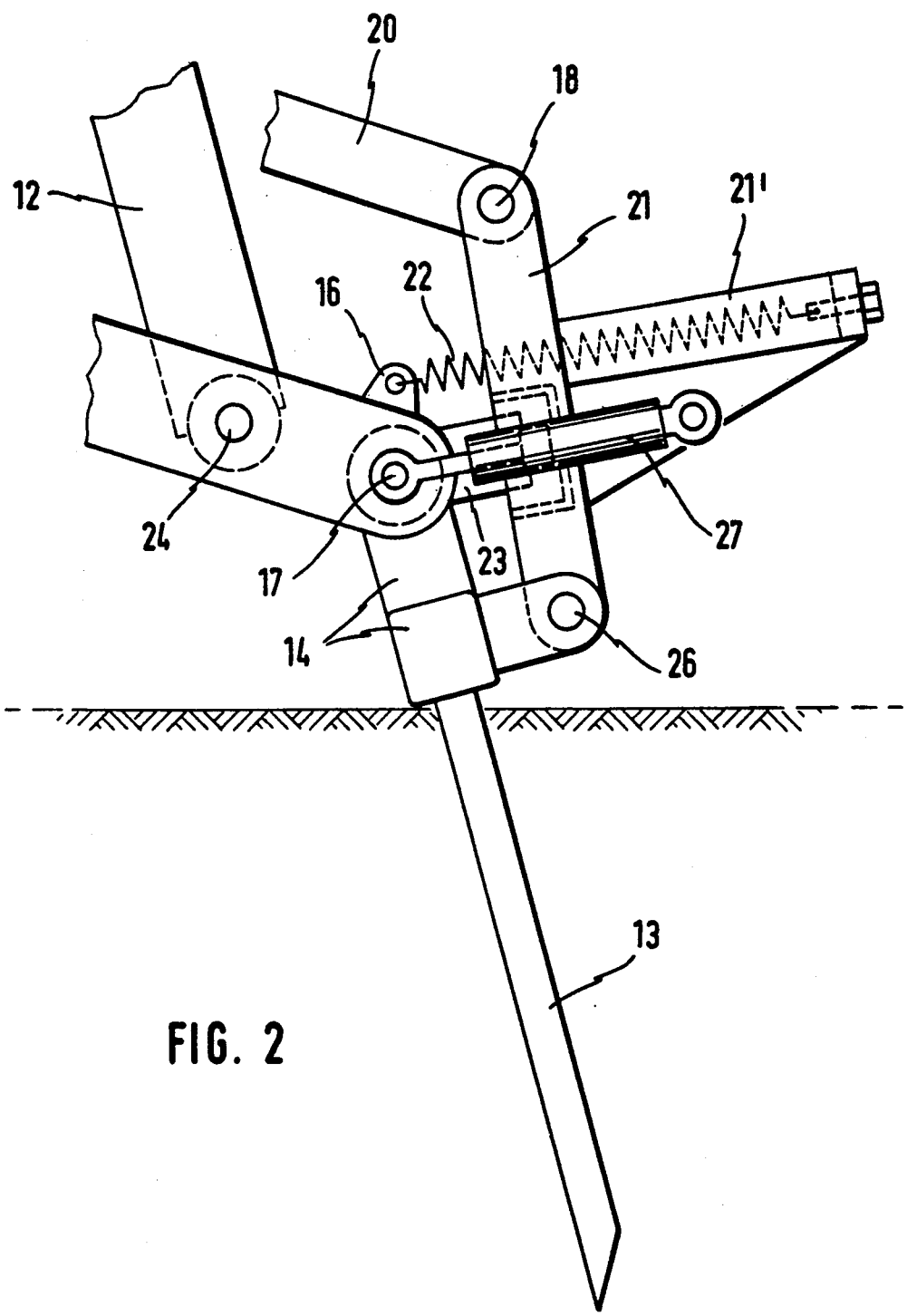

The detailed view in FIG. 2 shows a constructionally different arrangement of the stop-spring-assembly. The connecting lever 21 is provided with a support 21' to which the end of the spring 20 averted from the piercing tool 13 is fixed, namely preferably in a way as to be adjustable in the longitudinal direction of the spring, and to which one end of a damping tool 27 formed as a shock absorber is coupled which other end engages at coupling point 17 and which is effective, accordingly, parallel to the stop 23, i.e. the shock absorber absorbs the resetting movement acting under the force of the spring 22 on the piercing tool leaving the soil until the stop 23 starts to work.

I claim:

1. A self-powered arrangement connectable to a vehicle for loosening sub-soil, comprising: a plurality of piercing tools spaced along said arrangement; crank means; a linkage of connected elements driven by said crank means to reciprocatingly actuate said piercing tools for piercing the sub-soil; one of said connected elements being a working element connected to said crank through a crank rod and moving against a single spring to generate reciprocating motion of said piercing tools; a stop on said linkage for limiting said reciprocating motion; a chassis with a first mounted bearing for holding a first end of said working element, said working element having a second end connected to said piercing tools through tool mounting means; a second one of said connected elements being a guide lever having a first end held in a second mounted bearing on said chassis; a third one of said connected elements being a connecting lever having a first end connected to a second end of said guide lever and having a second end connected to said piercing tools through said tool mounting means; said one end and said other end of said working element being spaced from each other by a distance substantially equal to the distance between said first end and said second end of said guide lever, said first mounted bearing being spaced from said second mounted bearing by a distance substantially equal to the distance between said second end of said guide lever and said second end of said working element, said linkage being formed as a parallelogram linkage by said distances; means for adjusting the distance between said first mounted bearing and said second mounted bearing during motion of said piercing tools and said working element against said spring and away from said stop for loosening the sub-soil; said second end of said working element being connected to said tool mounting means by a first pivot, said second end of said connecting lever being connected to said tool mounting means through a second pivot spaced from said first pivot.

2. An arrangement as defined in claim 1, wherein said stop is located between said connecting lever and said tool mounting means.

3. An arrangement as defined in claim 1, wherein said stop has an adjustable spacing to a mounting surface on said connecting lever.

4. An arrangement as defined in claim 1, wherein said stop comprises shock absorbing material; and damping means arranged on top of said tool mounting means and substantially parallel to said stop.

5. An arrangement as defined in claim 4, wherein said stop, said damping means and said spring form a structural unit.

6. An arrangement as defined in claim 1, wherein said working element has a lever arm connected to said tool mounting means, said spring being connected between said lever arm and said second end of said guide lever.

7. An arrangement as defined in claim 1, wherein said guide lever extends above said working element when viewed parallel to a plane of said sub-soil.

8. An arrangement as defined in claim 7, wherein said connecting lever and said guide lever substantially surround said working lever.

9. An arrangement as defined in claim 1, wherein said crank rod is connected to said working element at a pivot between said piercing tools and said tool mounting means.

10. An arrangement as defined in claim 1, wherein said piercing tools are arranged in groups of at least pairs, each group having a respective of said crank, linkage, stop, and spring; each crank operating the respective group at an actuating angular position differing from the actuating angular positions of the other cranks.

11. A self-powered arrangement connectable to a vehicle for loosening sub-soil, comprising: a plurality of piercing tools spaced along said arrangement; crank means; a linkage of connected elements driven by said crank means to reciprocatingly actuate said piercing tools for piercing the sub-soil; one of said connected elements being a working element connected to said crank through a crank rod and moving against a single spring to generate reciprocating motion of said piercing tools; a stop on said linkage for limiting said reciprocating motion; a chassis with a first mounted bearing for holding a first end of said working element, said working element having a second end connected to said piercing tools through tool mounting means; a second one of said connected elements being a guide lever having a first end held in a second mounted bearing on said chassis; a third one of said connected elements being a connecting lever having a first end connected to a second end of said guide lever and having a second end connected to said piercing tools through said tool mounting means; said one end and said other end of said working element being spaced from each other by a distance substantially equal to the distance between said first end and said second end of said guide lever, said first mounted bearing being spaced from said second mounted bearing by a distance substantially equal to the distance between said second end of said guide lever and said second end of said working element, said linkage being formed as a parallelogram linkage by said distances; means for adjusting the distance between said first mounted bearing and said second mounted bearing during motion of said piercing tools and said working element against said spring and away from said stop for loosening the sub-soil; said second end of said working element being connected to said tool mounting means by a first pivot, said second end of said connecting lever being connected to said tool mounting means through a second pivot spaced from said first pivot; said stop comprising shock absorbing material; and damping means arranged on top of said tool mounting means and substantially parallel to said stop.

12. A self-powered arrangement connectable to a vehicle for loosening sub-soil, comprising: a plurality of piercing tools spaced along said arrangement; crank means; a linkage of connected elements driven by said crank means to reciprocatingly actuate said piercing tools for piercing the sub-soil; one of said connected elements being a working element connected to said crank through a crank rod and moving against a single spring to generate reciprocating motion of said piercing tools; a stop on said linkage for limiting said reciprocating motion; a chassis with a first mounted bearing for holding a first end of said working element, said working element having a second end connected to said piercing tools through tool mounting means; a second one of said connected elements being a guide lever having a first end held in a second mounted bearing on said chassis; a third one of said connected elements being a connecting lever having a first end connected to a second end of said guide lever and having a second end connected to said piercing tools through said tool mounting means; said one end and said other end of said working element being spaced from each other by a distance substantially equal to the distance between said first end and said second end of said guide lever, said first mounted bearing being spaced from said second mounted bearing by a distance substantially equal to the distance between said second end of said guide lever and said second end of said working element, said linkage being formed as a parallelogram linkage by said distances; means for adjusting the distance between said first mounted bearing and said second mounted bearing during motion of said piercing tools and said working element against said spring and away from said stop for loosening the sub-soil; said second end of said working element being connected to said tool mounting means by a first pivot, said second end of said connecting lever being connected to said tool mounting means through a second pivot spaced from said first pivot; said stop being located between said connecting lever and said tool mounting means; said stop having an adjustable spacing to a mounting surface on said connecting lever; said stop comprising shock absorbing material; said working element having a lever arm connected to said tool mounting means, said spring being connected between said lever arm and said second end of said guide lever; said stop, said damping means and said spring forming a structural unit; said guide lever extending above said working element when viewed parallel to a plane of said sub-soil; said connecting lever and guide lever substantially surrounding said working lever; said crank rod being connected to said working element at a pivot between said piercing tools and said tool mounting means.

* * * * *